Nov. 13, 1962 R. E. WILLIAMS 3,063,076
METHOD OF MAKING A FOOT CUSHIONING DEVICE
Filed April 18, 1960
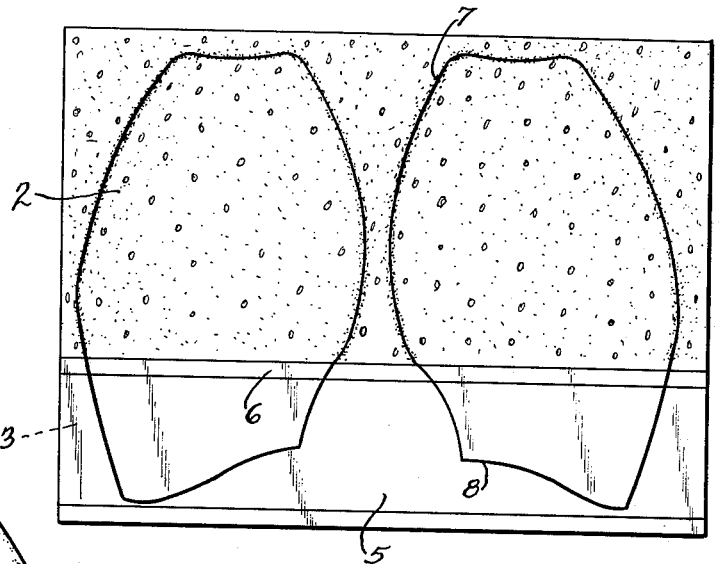
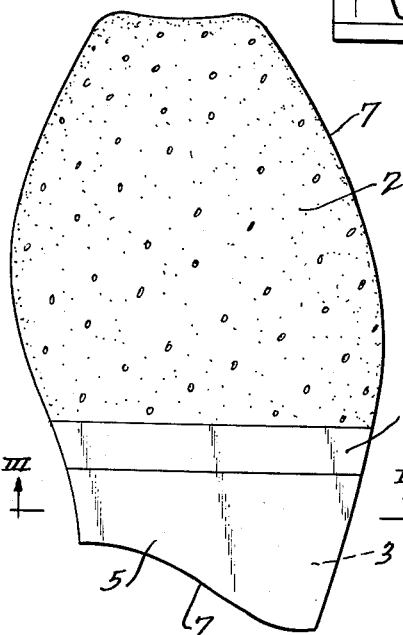
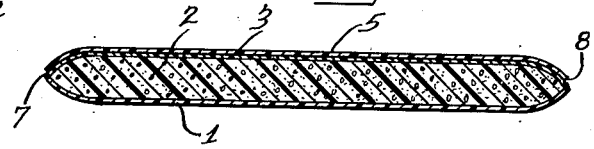
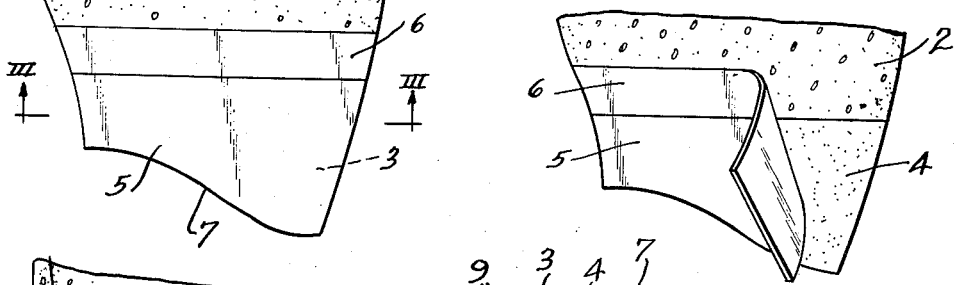
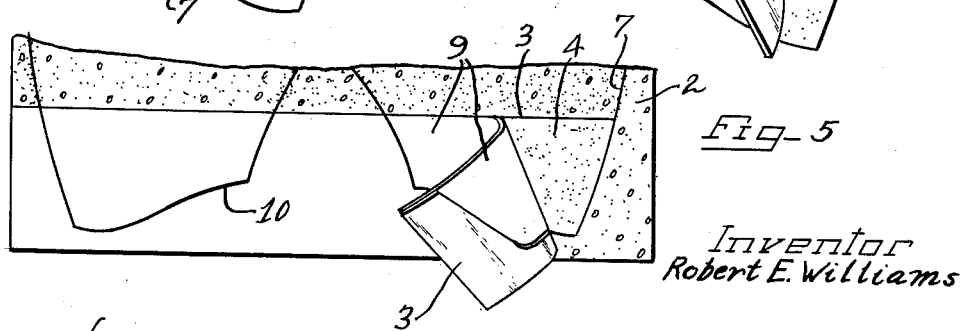
Inventor
Robert E. Williams
by Hill, Sherman, Meroni, Gross & Simpson  Attys.

United States Patent Office 3,063,076
Patented Nov. 13, 1962

3,063,076
METHOD OF MAKING A FOOT CUSHIONING DEVICE
Robert E. Williams, Chicago, Ill., assignor to The Scholl Mfg. Co., Inc., Chicago, Ill., a corporation of New York
Filed Apr. 18, 1960, Ser. No. 23,094
2 Claims. (Cl. 12—146)

This invention relates to improvements in a foot cushioning device and method of making the same, and more particularly to a foot cushioning device for insertion into an article of foot wear, the device carrying pressure sensitive adhesive by means of which it is anchored in proper position within an article of foot wear, and the invention also relates to a method of attaching a strip of adhesive tape to an article by way of heat sealing the tape backing to the article while the original facing remains on the tape, although the invention may have other uses and purposes as will be apparent to one skilled in the art.

It has been found that many articles heretofore made of different materials, can more economically be manufactured by heat sealing thermoplastic materials together with a die shaped to outline the resultant article utilized in a press equipped with electronic high frequency heat sealing means. The process is more economical and the resultant article is better in appearance and durability than were articles previously made of different materials. Some difficulty was experienced, however, when the resultant article was to carry a pressure sensitive adhesive, at least on a portion of the article, by means of which the article could be fixed in its desired position. It was desirable to do as much as possible in a single operation, and accordingly utilize an adhesive tape having a thermoplastic backing which was heat sealed directly to the thermoplastic of the article itself. Difficulty was experienced in protecting the adhesive surface of the tape with a facing during the process of manufacture of the article, and this necessitated removal of the original facing on the tape, and replacement thereof with another temporary facing after the article had been formed. That process was objectionable due to the care and labor involved, thus making the entire process more expensive than is desired.

In view of the foregoing, it is an important object of the instant invention to provide a method of joining a piece of plastic backed adhesive tape to a thermoplastic article by way of electronic heat sealing, with the adhesive tape carrying its original facing prior to, during, and after the heat sealing operation, the original facing remaining as a temporary protection to the adhesive surface in the finished article.

Another object of the instant invention is the provision of a method of providing an article which includes the steps of assembling a strip of adhesive tape having a thermoplastic backing and a thermoplastic facing strip covering the adhesive surface, which facing strip is incompatible for heat sealing purposes with the backing of the tape, and with the aid of a die, electronically heat sealing the tape backing to a sheet of thermoplastic material and at the same time providing a tear line along which the resultant article may be removed from the waste stock, the tear line also being in the facing for the adhesive, but the facing not being heat sealed to either the backing or the sheet.

Also an object of the instant invention is the provision of a method of making a foot cushioning device which comprises superposing a plurality of layers of thermoplastic material with a piece of adhesive tape having a thermoplastic backing and a facing over the adhesive surface incompatible for electronic heat sealing purposes, and then with the aid of a die, heat sealing the laminations and the tape backing together in a seam defining the resultant article and at the same time providing a tear line which is also included in the facing for the adhesive, but wherein the facing is not heat sealed to the backing or laminations.

It is a still further object to the instant invention to provide a foot cushioning device comprising a plurality of laminations of thermoplastic material with a thermoplastic backed adhesive tape all heat sealed together, and a facing on the adhesive tape that is incompatible with the backing or the laminations for heat sealing purposes, but which facing is the original facing for the adhesive that was present prior to the heat sealing operation.

While some of the more salient features, characteristics and advantages of the instant invention have been above pointed out, others will become apparent from the following disclosures, taken in conjunction with the accompanying drawing, in which:

FIGURE 1 is a plan view of superposed laminations of material, illustrating in general the process embodied in the instant invention;

FIGURE 2 is a bottom plan view of a foot cushioning device embodied in the instant invention and made in accordance with the process indicated in FIGURE 1;

FIGURE 3 is an enlarged transverse vertical sectional view taken substantially as indicated by the line III—III of FIGURE 2, looking in the direction of the arrows;

FIGURE 4 is a fragmentary view of the lower portion of FIGURE 2, illustrating the removal of the adhesive facing member; and FIGURE 5 is a fragmentary view similar in character to FIGURE 4, indicating a previous and more costly method of making an article, which the instant invention is designed to remedy.

As shown on the drawings:

While the instant invention is illustrated and herein described in connection with the making of a foot cushioning device in the form of a half insole, it should be understood that foot cushioning devices of various other shapes may be similarly provided, as well as various other articles on which it is desired to have an area of pressure sensitive adhesive for affixing the article to some surface.

It should also be noted that in the manufacture of an article by way of the instant invention, it makes no difference in which order the various laminations are stacked. That is, the heat sealing die may be applied to the bottom of the finished device or to the top of the finished device. However, since the adhesive tape does not cover the entire undersurface of the device, it is more feasible to superpose the laminations in reverse order so that the bottom surface of the finished article is uppermost, thus facilitating the handling of the smaller piece of adhesive tape, this manner of procedure being desirable for ease and economy in manufacture.

It should further be mentioned that in the making of an article under the principles of the instant invention, the number and character of laminations may be varied substantially as desired. By way of example, therefore, and not by way of limitation, I have selected a foot cushioning device as illustrative of the process, and even in the making of such a device, more or less laminations may be utilized, if desired.

The illustrated embodiment of the invention includes a sheet or layer 1 of thermoplastic material which is preferably in the form of an unsupported film, a vinyl film being satisfactory. Superposed upon this sheet is another thicker sheet or layer 2 of thermoplastic foam, which may be vinyl foam, polyurethane foam or any other substance compatible for heat sealing purposes with the sheet 1.

Both the sheets 1 and 2 are of indefinite length and may be stock sheets of considerable size.

In a preselected location over the foam layer 2, a strip of adhesive tape is disposed. This strip of adhesive tape comprises a thermoplastic backing 3 having a pressure sensitive adhesive spread 4 over one face thereof as seen in FIGURE 4. The backing of the adhesive tape may satisfactorily be an unsupported vinyl film or some other thermoplastic film that is compatible with both the sheets 1 and 2 for electronic heat sealing purposes.

The adhesive surface 4 is protected with a facing strip 5, preferably wider than the adhesive tape itself so that the strip 5 has a marginal portion 6 projecting freely beyond the adhesive tape. While this facing 5 may be of any suitable material capable of being provided with a tear line at the time of heat sealing, it is preferably a transparent thermoplastic material that is not compatible for heat sealing purposes with the sheets 1 and 2 or the adhesive tape backing 3. For this purpose, a polyethylene, acetate, or cellophane film, among others, is satisfactory. It is not essential that this film be transparent, but such gives a more pleasing appearance to the resultant article, and the film may carry any desired printing thereon including directions for its removal, size designation, etc.

In making the device, a die of suitable shape to outline the resultant article is provided and this may be utilized in any suitable press equipped with electronic heat sealing mechanism, with the other electrode being merely a flat plate having a suitable buffer thereon. Preferably a pair of dies for left and right articles are utilized in the same press, and are brought down under pressure and high frequency electric current is passed through the die for a brief interval to heat seal the compatible layers 1, 2 and 3 together in a seam 7 which defines the bounding edge of the resultant device. At the same time, a tear line is provided substantially at the heat seal seam by which the device may readily be removed from the waste stock, and this tear line as indicated at 8, is also in the incompatible facing 5, whereby this facing is also removed with the finished device, but the facing is not heat sealed at the seam 7 to the other layers. Consequently, when it is desired to use the device it is a simple expedient to remove the facing by grasping the protruding margin 6 thereof, and strip it off to expose the adhesive surface 4 as shown in FIGURE 4. Thereafter the article may be properly located in a shoe or the like, and maintained in position by virtue of the adhesive surface adhering to the structural insole of the shoe.

It will be noted by way of this method of making the article, that the original facing on the adhesive is utilized throughout and remains over the adhesive in a protective position until the article is actually put to use. Accordingly, it is an extremely simple and economical matter to handle the adhesive during the manufacture of the article, the adhesive tape with the facing having been preassembled before disposition over the sheet 2.

By way of further explanation of the instant invention, it should be contrasted with the procedure previously followed, wherein the same sheets 1 and 2 are utilized and the same adhesive tape comprising the thermoplastic backing 3 with the adhesive spread 4 thereon are utilized. Previously, however, a facing over the adhesive, indicated at 9, was in the form of a creped paper or the like having a release coat thereon, and which was also immune to heat sealing. However, when the heat sealed die was utilized the paper 9 would be marked as indicated at 10, but such mark amounted to only a crease and not a tear line. Therefore, it was necessary to remove the adhesive facing 9 as indicated in FIGURE 5, and apply a new facing to the adhesive 4 contemporaneously with the time the article was separated from the waste material along the heat seal seam. This piece so applied could be of any material and would necessarily be substantially of the shape of the facing piece 5 with its protruding margin 6 as seen in FIGURE 2 for a right foot and an allochiral shape, of course, for the left foot. However, the removal of the original facing, the exposure of the adhesive surface at least once during the process, and the application of the new facing to the exposed adhesive surface all required not only extreme care but an objectionable amount of time and even a wastage of material in the process of making the article, considerably adding to the expense thereof. Obviously, the instant invention has lessened the production time, saved material, and added greatly to the economy of production.

It will be understood that modifications and variations may be effected without departing from the scope of the novel concepts of the present invention.

I claim as my invention:

1. The method of making a foot cushioning device, including the steps of superposing a sheet of thermoplastic foam on a sheet of vinyl film, providing a composite strip comprising an inner vinyl film having pressure sensitive adhesive on its outer face and a wider facing of polyethylene film over said adhesive, placing the composite strip on said foam sheet, then with the aid of a sole-shaped die, heat and tear sealing the vinyl films and foam sheet together and simultaneously severing but not heat sealing the facing along the outer edge of the device, and removing the device with the shaped piece of facing on the adhesive from the waste stock.

2. The method of making a foot cushioning device, including the steps of superposing a sheet of thermoplastic foam on a sheet of heat-sealable film, providing a composite strip comprising an inner heat-sealable film having pressure sensitive adhesive on its outer face and a wider facing of non-heat-sealable film over said adhesive, placing the composite strip on said foam sheet, then with the aid of a sole-shaped die, heat and tear sealing the heat-sealable films and foam sheet together and simultaneously severing but not heat sealing the facing along the outer edge of the device, and removing the device with the shaped piece of facing on the adhesive from the waste stock.

References Cited in the file of this patent

UNITED STATES PATENTS

| 2,391,539 | Avery | Dec. 25, 1945 |
| 2,716,625 | Scholl | Aug. 30, 1955 |
| 2,917,844 | Scholl | Dec. 22, 1959 |
| 2,917,850 | Scholl | Dec. 22, 1959 |
| 2,953,130 | Scholl | Sept. 20, 1960 |